United States Patent
Horton et al.

(10) Patent No.: US 8,915,531 B2
(45) Date of Patent: Dec. 23, 2014

(54) VEHICLE CONSOLE ASSEMBLY

(71) Applicant: Nissan North America, Inc., Franklin, TN (US)

(72) Inventors: Thomas Horton, White Lake, MI (US); Joseph Saroken, West Bloomfield, MI (US); Douglas Sparks, Westland, MI (US); Andrew Brant, Brighton, MI (US); Thomas Mally, Beverly Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/899,193

(22) Filed: May 21, 2013

(65) Prior Publication Data

US 2014/0346802 A1    Nov. 27, 2014

(51) Int. Cl.
*B60R 7/04* (2006.01)
*B60R 11/00* (2006.01)

(52) U.S. Cl.
CPC .................................... *B60R 11/00* (2013.01)
USPC ....................................................... 296/37.8

(58) Field of Classification Search
None
See application file for complete search history.

(56) References Cited

U.S. PATENT DOCUMENTS

| | | | |
|---|---|---|---|
| 6,170,787 B1 | 1/2001 | Morgan | |
| 7,210,723 B2 | 5/2007 | Sugawara et al. | |
| 7,806,451 B2 * | 10/2010 | Lota | 296/24.34 |
| 7,810,969 B2 | 10/2010 | Blackmore et al. | |
| 7,891,719 B2 | 2/2011 | Carnevali | |
| 8,007,020 B2 * | 8/2011 | Hipshier et al. | 296/37.8 |
| 8,020,913 B2 | 9/2011 | Kwolek | |
| 2007/0182183 A1 * | 8/2007 | Lota | 296/24.34 |
| 2009/0108618 A1 | 4/2009 | Hanson et al. | |
| 2009/0115215 A1 * | 5/2009 | Abro et al. | 296/24.34 |
| 2009/0174208 A1 * | 7/2009 | Lota | 296/24.34 |

FOREIGN PATENT DOCUMENTS

EP    1 939 035 A2    7/2008

* cited by examiner

*Primary Examiner* — Glenn Dayoan
*Assistant Examiner* — Sunsurraye Westbrook
(74) *Attorney, Agent, or Firm* — Global IP Counselors, LLP

(57) ABSTRACT

A vehicle console assembly includes a vehicle console and a support member. The vehicle console includes first and second cup holders. Each of the cup holders has an upper opening defined by a surface of the vehicle console and a bottom portion extending downwardly in the vehicle. The bottom portions of the cup holders are spaced from each other. The support member directly couples the bottom portion of the first cup holder to the bottom portion of the second cup holder. Also, the support member is spaced apart from the surface of the vehicle console that defines the upper openings.

20 Claims, 11 Drawing Sheets

VEHICLE CONSOLE ASSEMBLY

BACKGROUND

1. Field of the Invention

The present invention generally relates to a vehicle console assembly. More specifically, the present invention relates to a vehicle console assembly including a support member that couples the bottom portions of a plurality of cup holders together to improve stability of the cup holders.

2. Background Information

The passenger compartments of many vehicles include a vehicle center console that is typically positioned between the front driver's seat and the front passenger's seat. A vehicle center console typically includes a storage compartment having a lid that can be opened to access the storage compartment and closed to conceal the storage compartment. A vehicle center console also typically includes a plurality of cup holders, in particular, two cup holders that are positioned proximate to each other in the lengthwise direction of the vehicle or in a side-by-side relationship.

As known in the art, the cup holders can be formed as separate cylindrically shaped cavities in the upper panel of the vehicle center console during a molding process. Since the bottom portions of the cup holders are not secured, each of the cup holders can typically flex transversely due to the motion that occurs when a cup or bottle is being placed into or removed from either of the cup holders. The cup holders can also flex transversely when a person presses against the sides defining the cavities during, for example, cleaning of the cup holders. This transverse flexing or movement may cause the upper panel of the vehicle center console to become partially disengaged from the main body of the center console, thus adversely affecting the fit-and-finish of the center console and potentially requiring repair.

SUMMARY

Accordingly, it is desirable to increase the rigidity of the cup holders in a vehicle console assembly to improve durability and fit-and-finish of the vehicle console assembly.

In view of the state of the known technology, one aspect of a vehicle console assembly includes a vehicle console and a support member. The vehicle console includes first and second cup holders. Each of the cup holders has an upper opening defined by a surface of the vehicle console and a bottom portion extending downwardly in the vehicle. The bottom portions of the cup holders are spaced from each other. The support member directly couples the bottom portion of the first cup holder to the bottom portion of the second cup holder. Also, the support member is spaced apart from the surface of the vehicle console that defines the upper openings.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
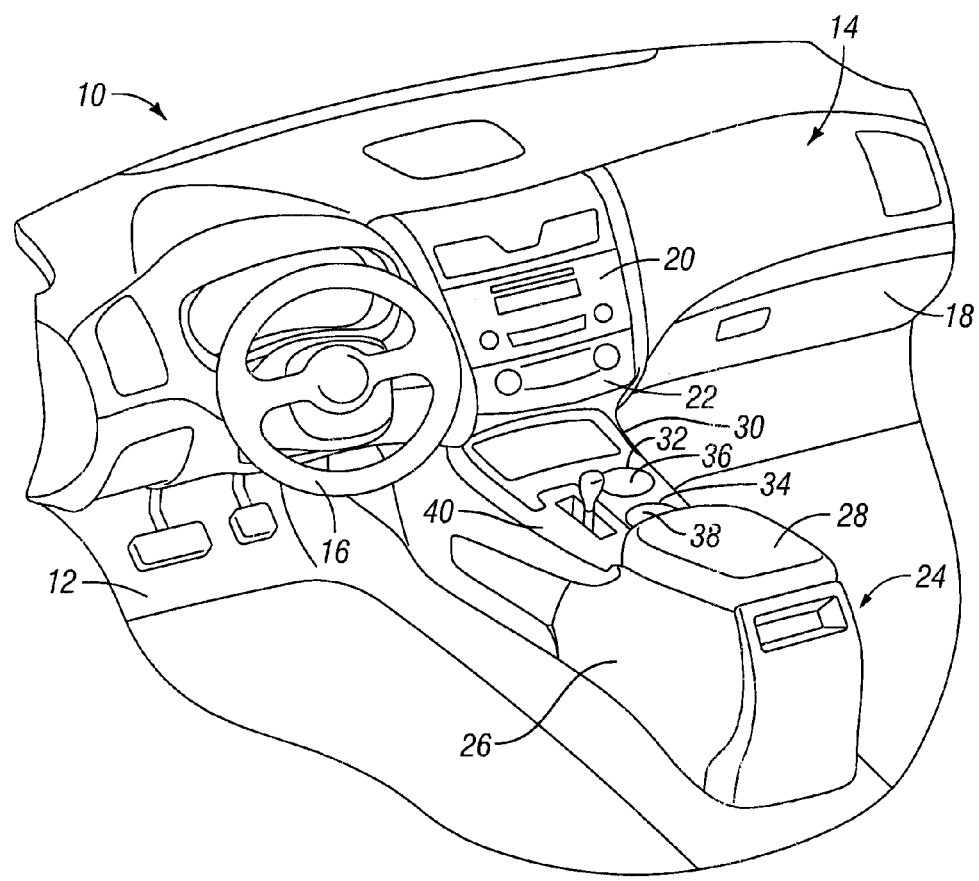
FIG. 1 is a perspective view of a passenger compartment of a vehicle showing a vehicle center console assembly according to a disclosed embodiment.

FIG. 1 illustrates a passenger compartment 10 of a vehicle. The passenger compartment 10 includes, among other things, a floor 12, an instrument panel 14 (also referred to as a dashboard) and vehicle seats (not shown). The instrument panel 14 can be a conventional assembly that includes, for example, a steering assembly 16, a glove box 18, an audio system control panel 20, and a climate control panel 22. The instrument panel 14 can include a variety of other conventional components, such as windshield wiper controls, light controls, and so on.

The passenger compartment 10 further includes a vehicle console assembly 24 in accordance with a disclosed embodiment. The vehicle console assembly 24 in this example is configured as a center vehicle console assembly and is mounted to the floor 12 between the driver's seat and front passenger's seat (not shown) using bolts, screws, rivets, clamps or in any other suitable manner as understood in the art. However, the vehicle console assembly 24 can be positioned at any other suitable location within the passenger compartment 10, such as between rear seats. As further shown in FIGS. 1 through 5, the vehicle console assembly 24 includes a console body 26 and a lid 28 that is moveable between a closed position and an open position (not shown) as understood in the art. The lid 28 conceals a storage compartment (not shown) when the lid 28 is in the closed position.

The vehicle console assembly 24 further includes a vehicle console 30 including a first cup holder 32 and a second cup holder 34 which are spaced from each other in the lengthwise direction of the vehicle. The components of the vehicle console assembly 24, such as the console body 26, the lid 28 and the vehicle console 30, can be made of plastic, composites or any other suitable material as known in the art.

Figure 6:
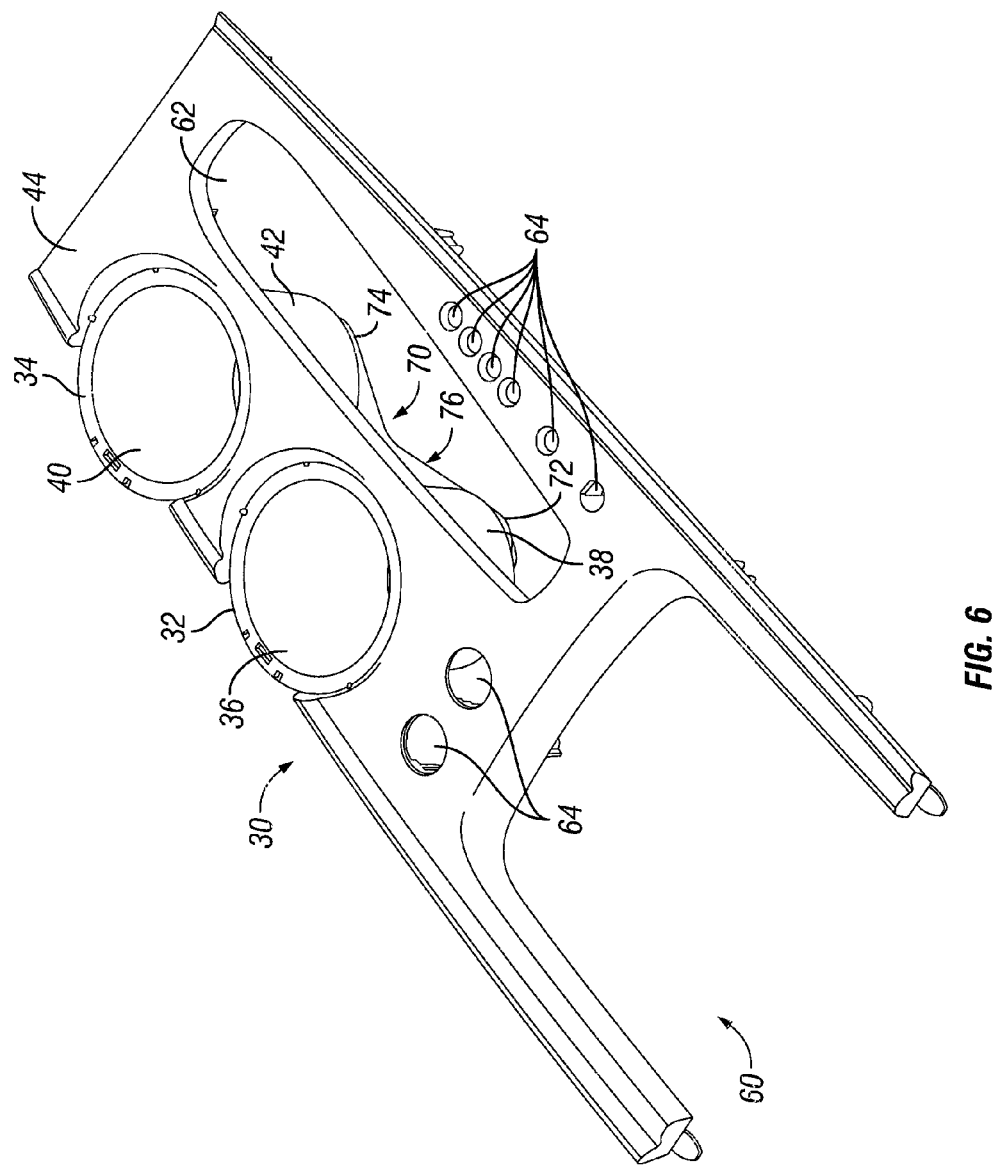
FIG. 6 is a top perspective view of the vehicle console shown removed from the vehicle console assembly shown in FIG. 1.
Figure 7:
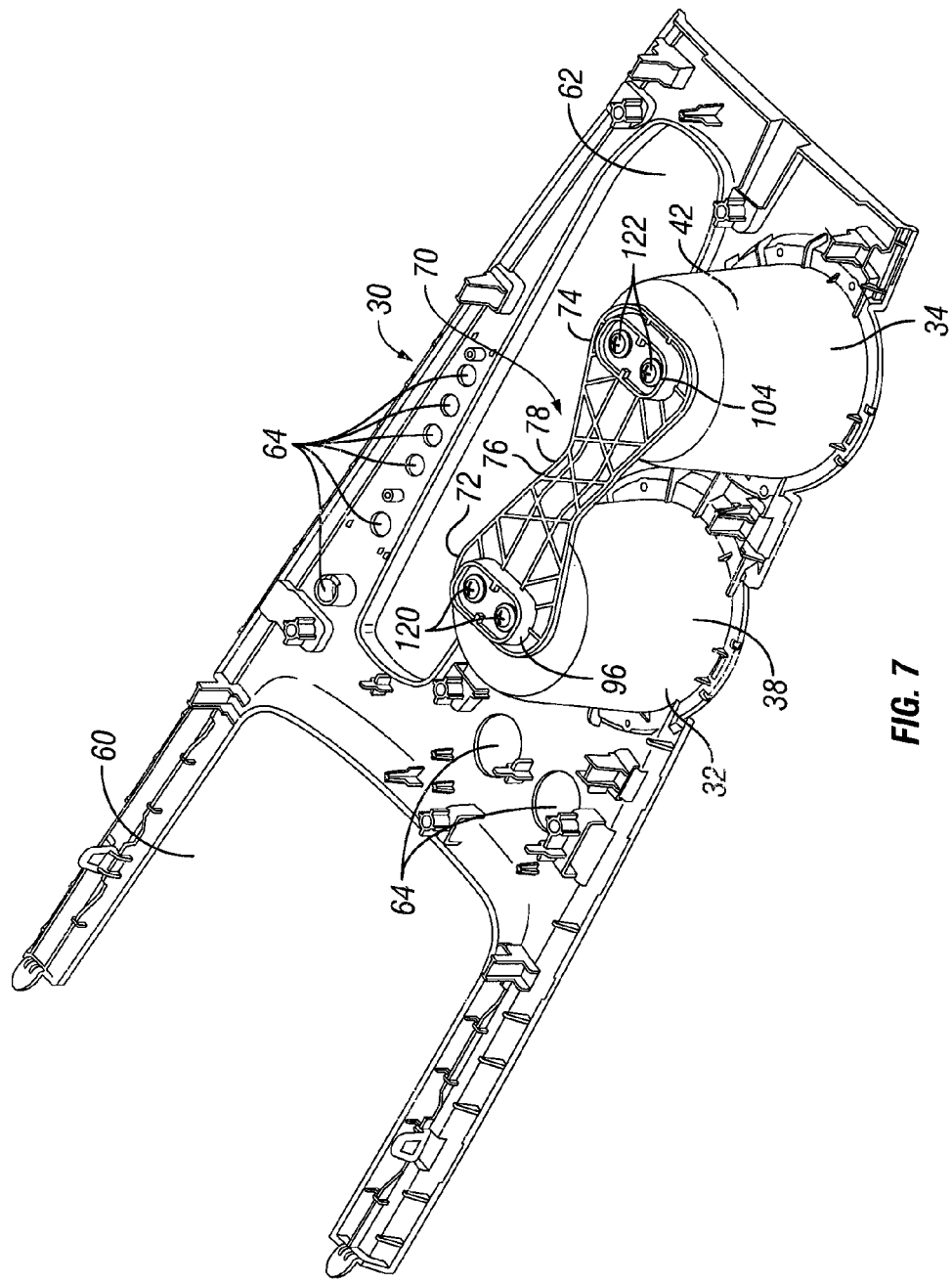
FIG. 7 is a bottom perspective view of the vehicle console with the support member attached to the bottoms of the cup holders.
Figure 8:
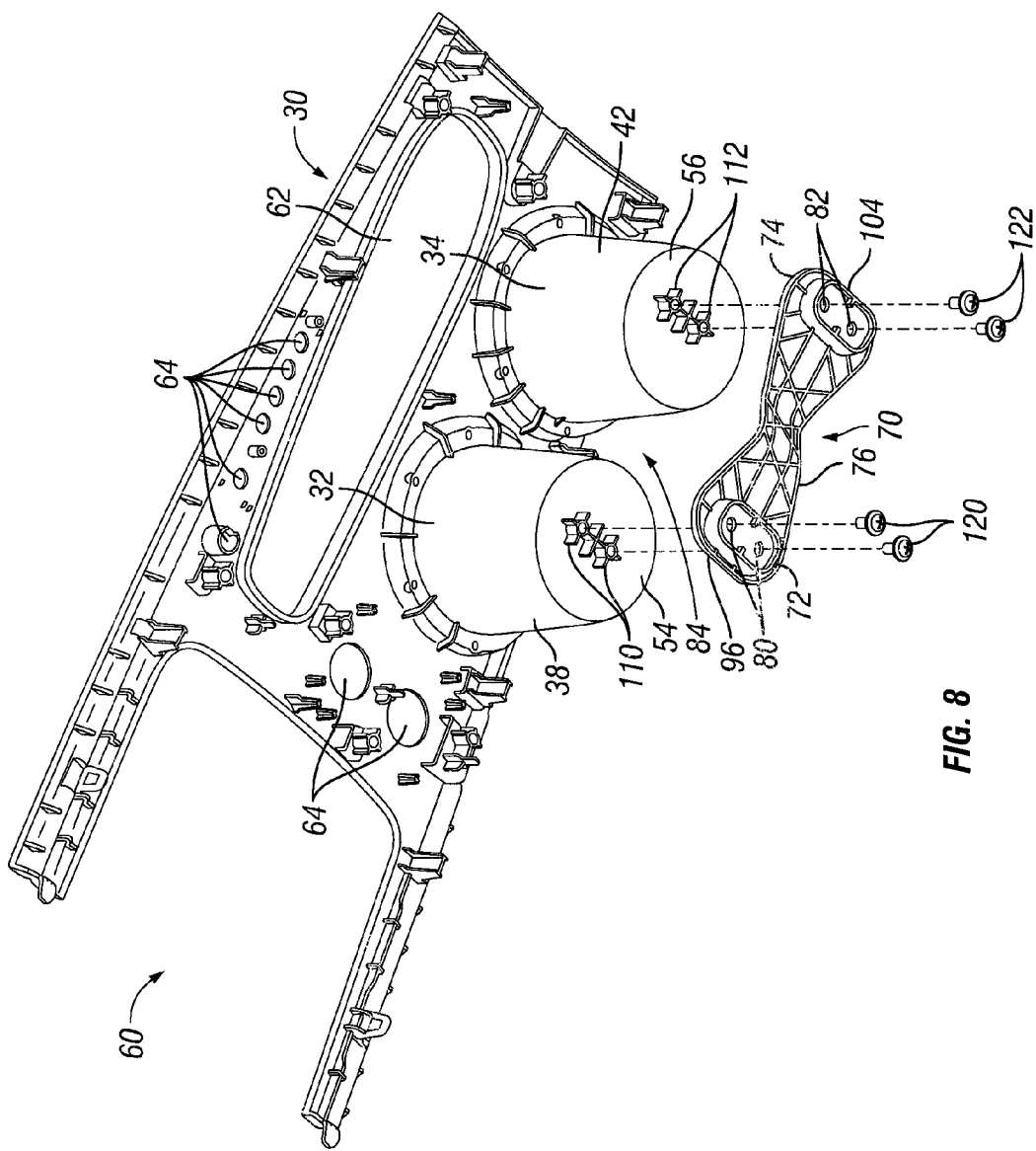
FIG. 8 is an exploded perspective view of the vehicle console as shown in FIG. 7.

As understood in the art and as shown in FIG. 6, the first and second cup holders 32 and 34 can be formed directly to the vehicle console 30 when the vehicle console 30 is formed. The first cup holder 32 has an upper opening 36 and a bottom portion 38 extending downwardly in the vehicle, and the second cup holder 34 has an upper opening 40 and a bottom portion 42 extending downwardly in the vehicle. The upper openings 36 and 40 are defined by a surface 44 of the vehicle console 30, in particular an upper surface of the vehicle console 30, and the bottom portions 38 and 42 of the first and second cup holders 32 and 34 are spaced from each other. In this example, the bottom portion 38 of the first cup holder 32 extends further downwardly in the vehicle than the bottom portion 42 of the second cup holder 34. However, the bottom portion 42 can instead be configured to extend further downwardly in the vehicle than the bottom portion 38, or the bottom portions 38 and 42 can extend downwardly to the same or substantially the same depth in the vehicle.

Accordingly, the first cup holder 32 defines a cavity 46 therein, and the bottom portion 38 is thus closed and has an outer surface 48. Likewise, the second cup holder 34 defines a cavity 50 therein, and the bottom portion 42 is also closed and has an outer surface 52. In other words, the cavities 46 and 50 in this example are isolated from the outer surfaces 48 and 52, respectively. However, the bottom portions 38 and 42 can include one or more openings (not shown) extending between the cavities 46 and 50 and the outer surfaces 48 and 52, respectively. In addition, the bottom portion 38 of the first cup holder 32 includes a first bottom surface 54 that extends transverse to a direction in which the bottom portion 38 of the first cup holder 32 extends in the vehicle. Also, the bottom portion 42 of the second cup holder 34 includes a second bottom surface 56 that extends transverse to a direction in which the bottom portion 42 of the second cup holder 34 extends in the vehicle. Each of the cup holders can further include an insert 58 that can be made of a resilient substance, such as rubber or any other suitable material. The insert 58 can be removably placed at the bottom of either or both of the cavities 46 and 50 as is conventional in the art.

Figure 2:
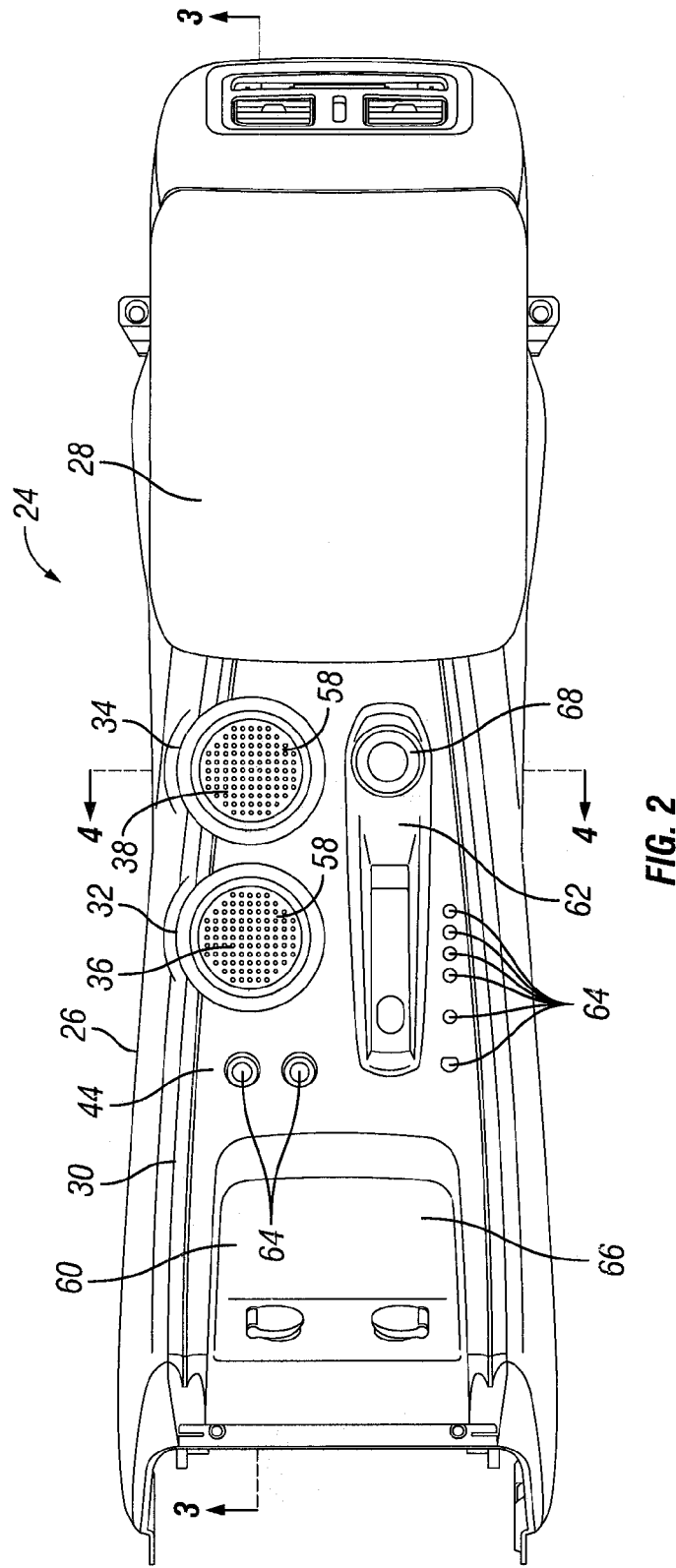
FIG. 2 is a plan view of the vehicle center console assembly shown in FIG. 1.
Figure 3:
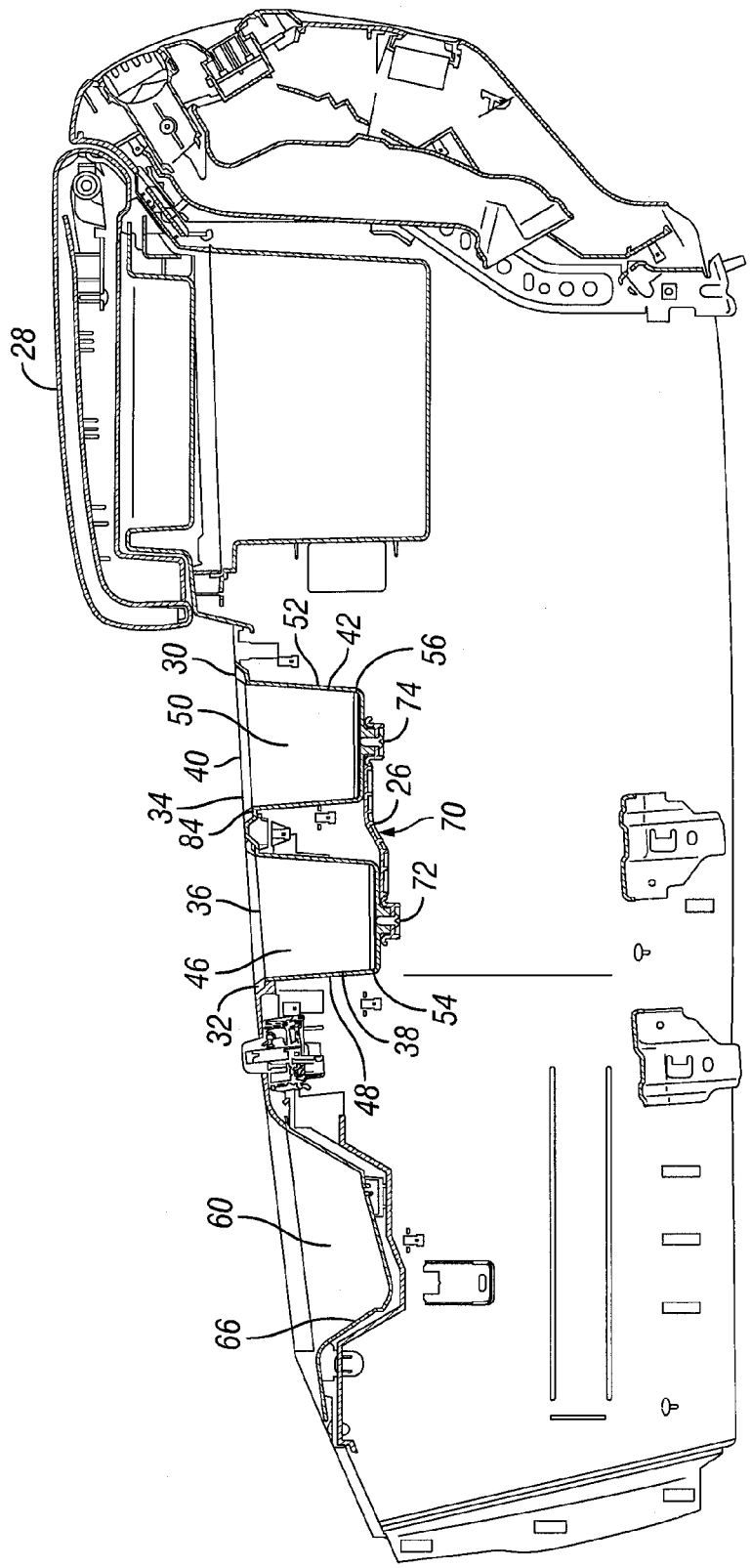
FIG. 3 is a cross-sectional side view of the vehicle center console assembly taken along lines 3-3 in FIG. 2.
Figure 4:
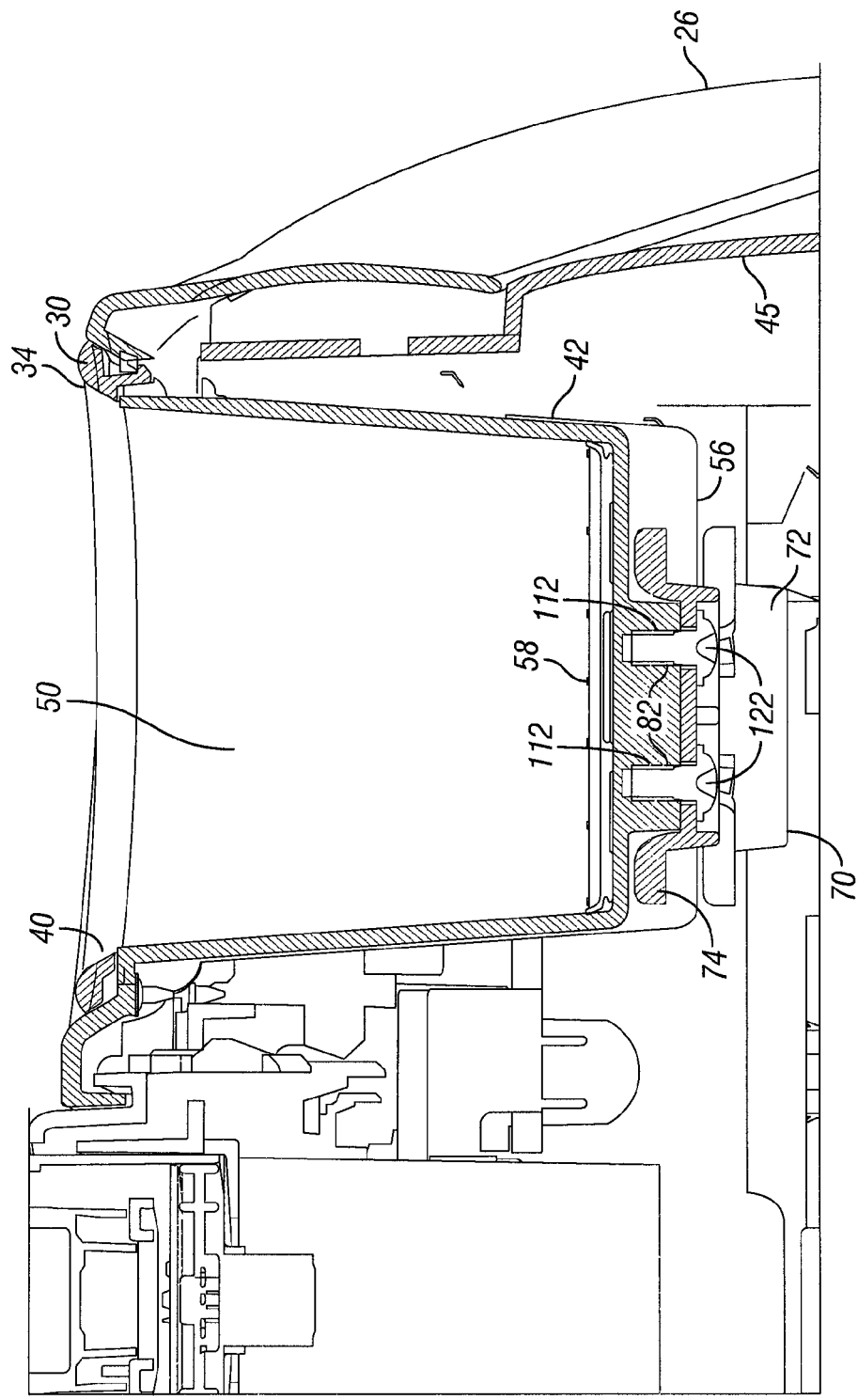
FIG. 4 is a cross-sectional rear view of the vehicle center console assembly taken along lines 4-4 in FIG. 2.
Figure 5:
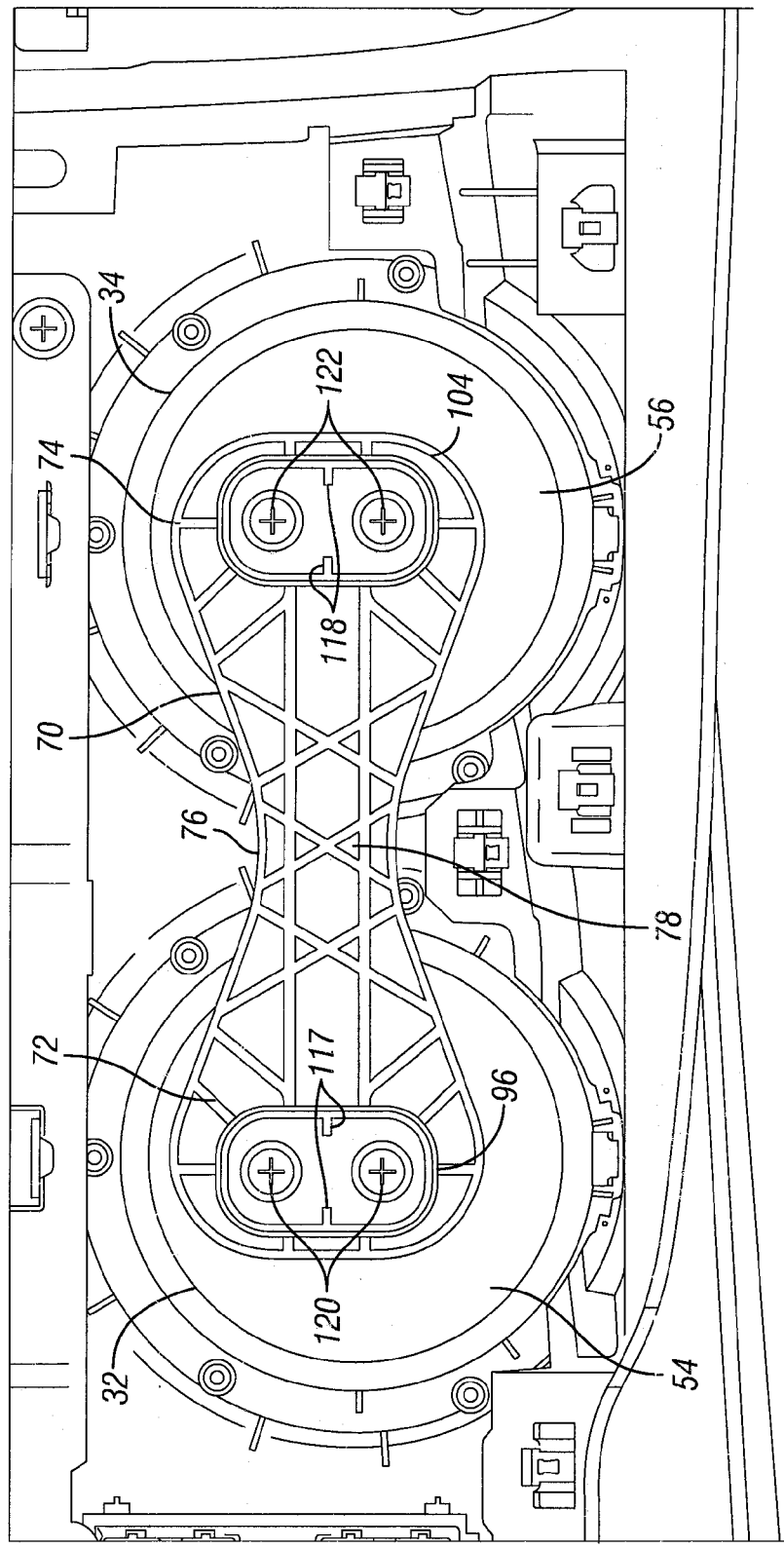
FIG. 5 is a detailed bottom view showing an example of a support member attached to the bottoms of cup holders in the vehicle console assembly shown in FIG. 1.

As can be further appreciated from FIG. 6, the vehicle console 30 can include a front opening 60, a slotted opening 62, and a plurality of circular openings 64. As shown in FIGS. 1 and 2, the front opening 60 can accommodate, for example, a tray portion 66 of the vehicle console assembly 24, and the slotted opening 62 can accommodate a gear shift 68. The circular openings 64 can accommodate, for example, switches, buttons, lights (not shown) or any other components of the vehicle console assembly 24 as understood in the art.

As shown in FIGS. 3 through 5, 7 and 8, the vehicle console assembly 24 further includes a support member 70 that directly couples the bottom portion 38 of the first cup holder 32 to the bottom portion 42 of the second cup holder 34. The support member 70 is spaced apart from the upper surface 44 of the vehicle console that defines the upper openings 36 and 40. Also, the console body 26 has a vertical portion 45 that extends in a vertical direction of the vehicle. The support member 70 is spaced apart from the vertical portion 45 when the support member 70 couples the bottom portions 38 and 42 of the first and second cup holders 32 and 34 together.

Figure 9:
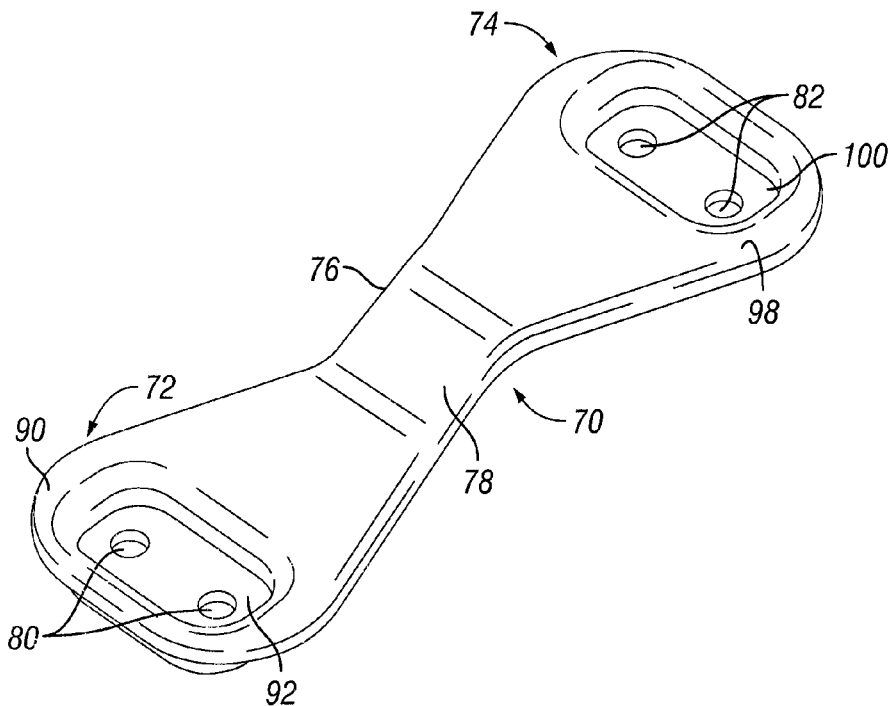
FIG. 9 is a top perspective view of the support member.
Figure 10:
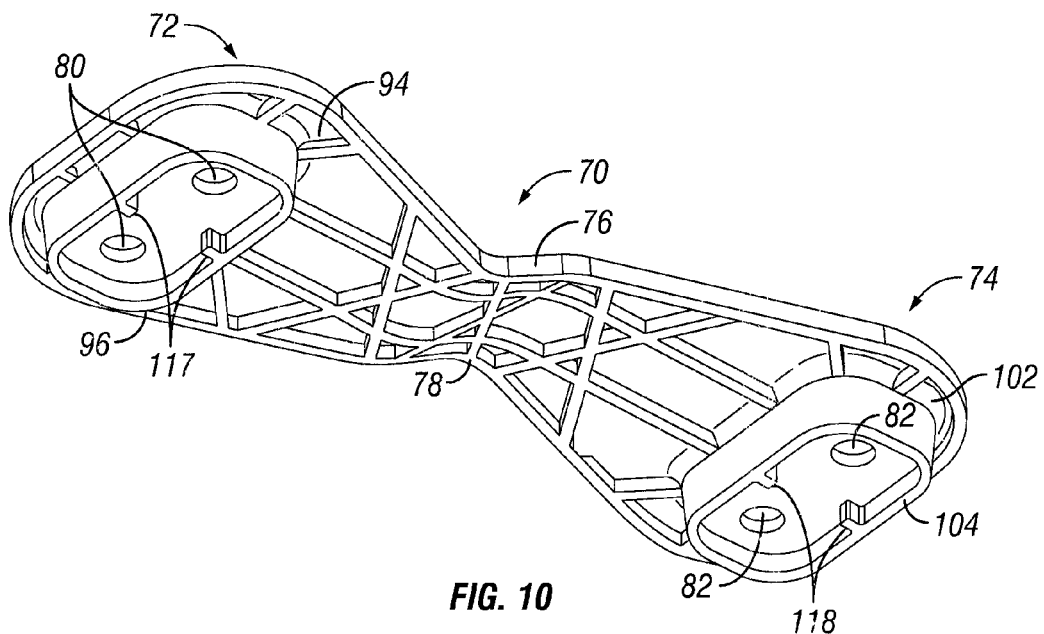
FIG. 10 is a bottom perspective view of the support member as shown in FIG. 9.
Figure 11:
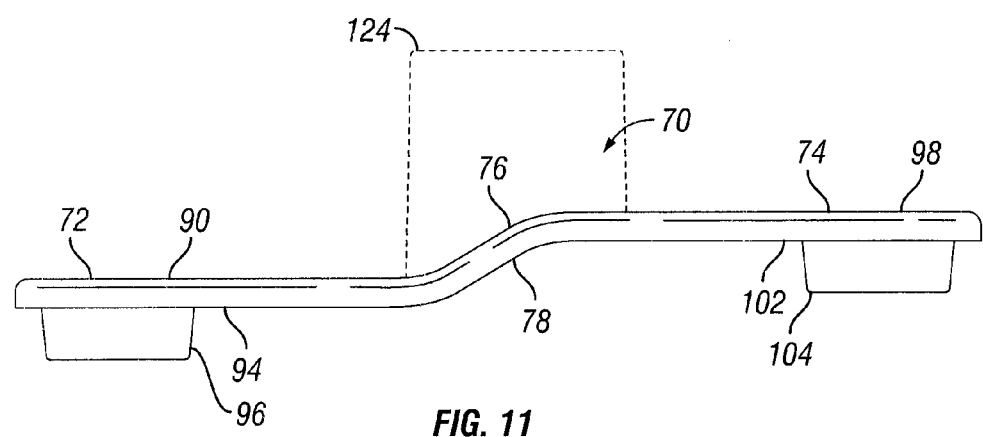
FIG. 11 is a side elevation of the support member as shown in FIG. 9.

As further shown in FIGS. 9 through 11, the support member 70 includes a first end 72, a second end 74 and an extension portion 76. The first and second ends 72 and 74 each have a respective width greater than a width of the extension portion 76. In addition, the extension portion 76 can include a stepped portion 78 which offsets the first and second ends 72 and 74 from each other so that the first and second ends 72 and 74 do not extend in the same plane. However, the extension portion 76 can instead be planar without the stepped portion so that the first and second ends 72 and 74 extend in the same or substantially the same plane. In addition, the first end 72 of the support member 70 defines at least one first opening 80 therein and the second end 74 of the support member 70 defines at least one second opening 82 therein, the purpose of which is described below.

Accordingly, as shown in FIGS. 3-5, 7 and 8, the first and second ends 72 and 74 of the support member 70 are configured to couple to the first and second bottom surfaces 54 and 56, respectively, of the bottom portions 38 and 42 of the first and second cup holders 32 and 34. As indicated, the support member 70 extends in a lengthwise direction along the lengthwise direction of the vehicle, and the extension portion 76 extends between the first and second ends 72 and 74 across a space 84 between the bottom portions 38 and 42 of the first and second cup holders 32 and 34. Therefore, the support member 70 prevents the bottom portions 38 and 42 of the first and second cup holders 32 and 34 from moving toward each other while the support member 70 is coupled to the bottom portions 38 and 42. Furthermore, in this example, the bottom portion 38 of the first cup holder 32 extends further downwardly in the vehicle than the bottom portion 42 of the second cup holder 34. Therefore, the stepped portion 78 positions the first end 72 lower in the vehicle than the second end 74 when the support member 70 is coupled to the first and second cup holders 32 and 34. Alternatively, the first and second ends 72 and 74 of the support member 70 can be coupled to side surfaces of the first and second cup holders 32 and 34, respectively.

The first and second ends 72 and 74 can be coupled to the bottom portions 38 and 42 in any suitable manner. For example, the first end 72 of the support member 70 includes a first side 90 at which a first support member mating structure 92 is disposed and a second side 94 opposite to the first side 90 at which a first interference structure 96 is disposed. Also, the second end 74 of the support member 70 includes a first side 98 at which a second support member mating structure 100 is disposed and a second side 102 opposite to the first side 100 at which a second interference structure 104 is disposed.

In this example, the first and second support member mating structures 92 and 100 can be configured as cavities as illustrated. However, the first and second support member mating structures 92 and 100 can be configured as projections, tabs, slotted portions, or in any other suitable manner. The openings 80 can be present at a portion of the first side 90 of the first end 72 defining the cavity of the first support member mating structure 92. Likewise, the openings 82 can be present at a portion of the first side 98 of the second end 74 defining the cavity of the second support member mating structure 100.

The first and second interference structures 96 and 104 in this example are each configured as projecting portions opposite to the cavities of the first and second support member mating structures 92 and 100, respectively. As shown, the openings 80 and 82 can extend through the first and second ends 72 and 74 such that they are surrounded by the first and second interference structures 96 and 104, respectively. However, the first and second interference structures 96 and 104 can be configured as projections, tabs or in any other suitable manner.

As further shown, the bottom surface 54 of the bottom portion 38 of the first cup holder 32 includes a first cup holder mating structure 110. Also, the bottom surface 56 of the bottom portion 42 of the second cup holder 34 includes a second cup holder mating structure 112. In this example, each of the first and second cup holder mating structures 110 and 112 can be configured as a plurality of projections that are received within the cavities in the first and second support member mating structures 92 and 100, respectively. The projections of the first cup holder mating structure 110 can define a first cup holder bottom opening 114 (e.g., defined by a post or boss) that aligns with one of the openings 80 when the support member 70 is coupled to the bottom portion 38 of the first cup holder 32. Similarly, the projections of the second cup holder mating structure 112 can define a second cup holder bottom opening 116 that aligns with one of the openings 82 when the support member is coupled to the bottom portion 42 of the second cup holder 34. In this example, the first and second cup holder bottom openings 114 and 116 are isolated from, and are thus not in communication with, the cavities 46 and 50 of the first and second cup holders 32 and 34, respectively. However, if desired, the first and second cup holder bottom openings 114 and 116 can be in communication with the cavities 46 and 50 and concealed from view by the inserts 58 within the passenger compartment 10. Also, the first and second cup holder mating structures 110 and 112 can be configured as tabs, slots or in any suitable manner that is complementary to the first and second support member mating structures 92 and 100 and enables the first and second cup holder mating structures 110 and 112 to mate with the first and second support member mating structures 92 and 100.

Furthermore, the first interference structure 96 includes first interference walls 117, and the second interference structure 104 includes second interference walls 118. Due to the configuration of the first and second interference walls 117 and 118, the first interference structure 96 prevents the second side 94 of the first end 72 of the support member 70 from coupling to the first cup holder mating structure 110. Similarly, the second interference structure 104 prevents the second side 102 of the second end 74 of the support member 70 from coupling to the second cup holder mating structure 112. In other words, the first and second interference walls 117 and 118 can contact the first and second cup holder mating structures 110 and 112 in order to inhibit upside-down installation of the support member 70. Naturally, the support member 70 need not include both of the first and second support mating structures 92 and 100, and both of the first and second interference structures 96 and 104. Rather, the support member 70 can include solely the first mating structure 92 and the first interference structure 96 or solely the second mating structure 100 and the second interference structure 104. Likewise, the vehicle console 30 can include only the first cup holder mating structure 110 or only the second cup holder mating structure 104. Also, the structures can be reversed so that the first and second support mating structures 92 and 100 are configured as the first and second cup holder mating structures 110 and 112 as described herein, and vice-versa.

Also, as shown in FIGS. 4, 5, 7 and 8, each of the first openings 80 in the first end 72 of the support member 70 is configured to receive a first fastener 120 that is further received in a corresponding first cup holder bottom opening 114 to couple the first end 72 to the bottom portion 38 of the first cup holder 32. Similarly, each of the second openings 82 in the second end 74 of the support member 70 is configured to receive a second fastener 122 that is further received into a corresponding second cup holder bottom opening 116 to couple the second end 74 to the bottom portion 42 of the second cup holder 34. Since the first and second interference structures 96 and 104 in this example extend further outward from the second sides 94 and 102 of the support member 70 than do the first and second fasteners 120 and 122, the first and second interference structures 96 and 104 also prevent the first and second fasteners 120 and 122 from contacting any other components in the vehicle console assembly 24, such as wiring and so on. The first and second fasteners 120 and 122 can be identical or different from each other, and can be screws, rivets, pins or any other suitable fasteners as known in the art. Alternatively or additionally, the first and second ends 72 and 74 can be coupled to the bottom portions 38 and 42, respectively, by snap-fitting, adhesives, heat bonding or in any other suitable manner.

As further shown in dashed lines in FIG. 11, the support member 70 can include an extension member 124 that extends upwardly from the extension portion 76. Therefore, the extension member 124 can be positioned between the bottom portions 38 and 42 of the first and second cup holders 32 and 34 when the support member 70 is coupled to the bottom portions 38 and 42. This extension member 124 can therefore further prevent the bottom portions 38 and 42 from moving toward each other and provide additional rigidity.

Figure 12:
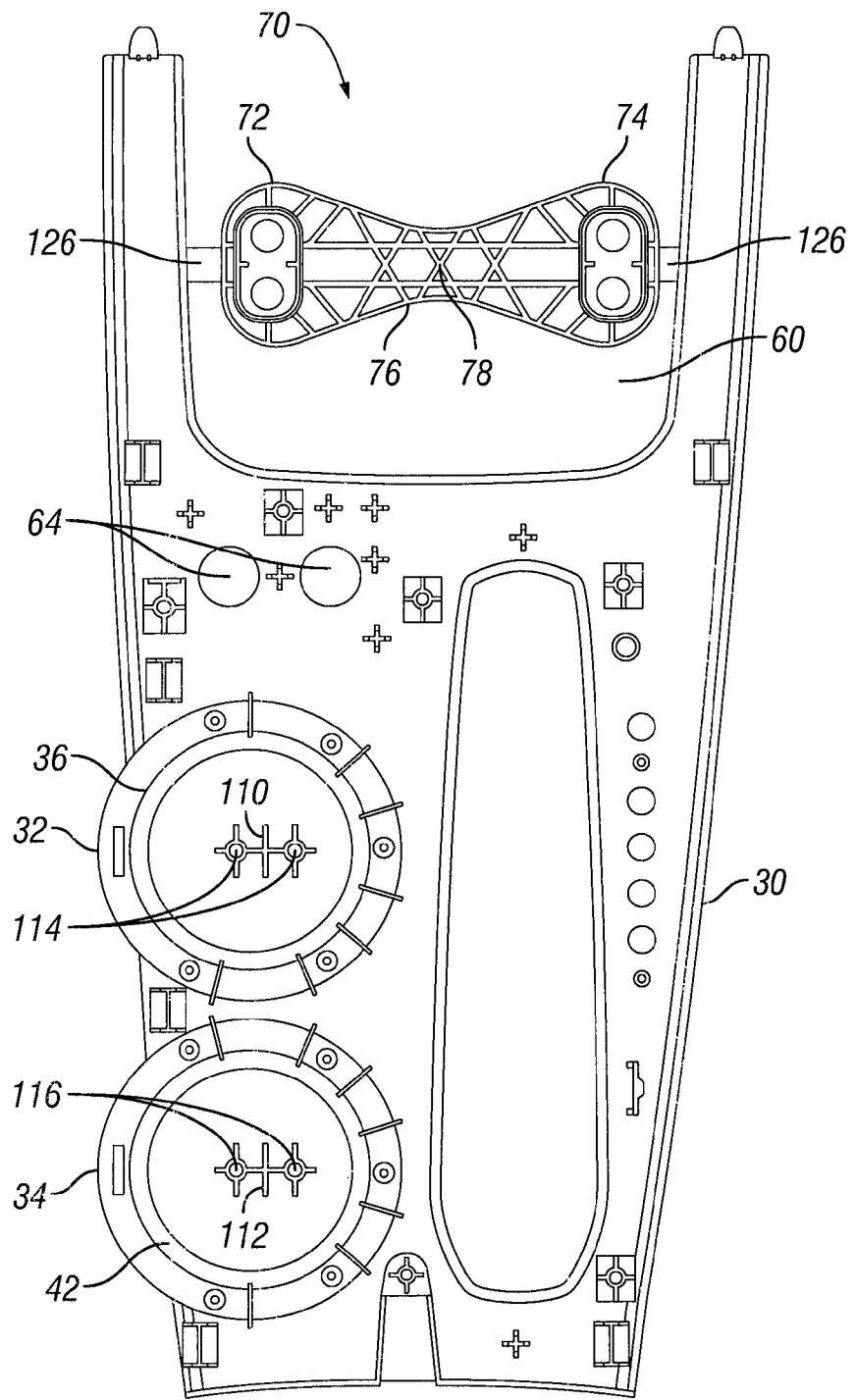
FIG. 12 illustrates an example of the vehicle console and support member being formed simultaneously during a molding process according to a disclosed embodiment.

It should also be noted that for ease of manufacture, the vehicle console 30 and the support member 70 can be manufactured simultaneously. That is, as shown in FIG. 12, the mold (not shown) which can be used to press form the vehicle console 30 and the support member 70 can include a support member forming portion that forms the support member 60 at a location where the front opening 60 is present in the vehicle console 30. The vehicle console 30 and the support member 70 can be formed during a single molding process and of the same material by using either a common cavity or a family mold. In the event that a common cavity is utilized, the vehicle console 30 and the support member 70 can initially be connected by bosses 126 or other connecting structures, which can later be removed as a further step in a manufacturing process. The vehicle console 30 and the support member 70 can also be made of different materials as desired.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle and passenger compartment equipped with the vehicle console assembly described herein. Accordingly, these terms, as utilized to describe the present invention should be interpreted relative to a vehicle equipped with the vehicle console assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle console assembly comprising:
   a vehicle console including first and second cup holders, each of the cup holders having an upper opening defined by a surface of the vehicle console and a bottom portion extending downwardly in the vehicle, the bottom portions of the cup holders being spaced from each other and the upper openings of the cup holders being spaced apart from each other; and
   a support member directly coupling the bottom portion of the first cup holder to the bottom portion of the second cup holder, the support member being spaced apart from the surface of the vehicle console that defines the upper openings.

2. The vehicle console assembly according to claim 1, wherein
   the support member includes a first end coupled to the bottom portion of the first cup holder, a second end coupled to the bottom portion of the second cup holder and an extension portion that extends between the first and second ends across a space between the bottom portions of the cup holders.

3. The vehicle console assembly according to claim 2, wherein
   the bottom portion of the first cup holder extends further downwardly in the vehicle than the bottom portion of the second cup holder; and
   the extension portion includes a stepped portion that positions the first end lower in the vehicle when the support member is coupled to the first and second cup holders.

4. A vehicle console assembly comprising:
   a vehicle console including first and second cup holders, each of the cup holders having an upper opening defined by a surface of the vehicle console and a bottom portion extending downwardly in the vehicle, the bottom portions of the cup holders being spaced from each other, and the bottom portion of the first cup holder including a first cup holder mating structure; and
   a support member directly coupling the bottom portion of the first cup holder to the bottom portion of the second cup holder, the support member being spaced apart from the surface of the vehicle console that defines the upper openings, and the support member including a first end coupled to the bottom portion of the first cup holder, a second end coupled to the bottom portion of the second cup holder and an extension portion that extends between the first and second ends across a space between the bottom portions of the cup holders;
   the first end of the support member including a first side at which a first support member mating structure is disposed and a second side opposite to the first side at which an interference structure is disposed, with the interference structure preventing the second side of the first end from coupling to the first cup holder mating structure.

5. The vehicle console assembly according to claim 4, wherein
   the first support member mating structure is configured as a cavity and the first cup holder mating structure includes a projection that is received within the cavity.

6. The vehicle console assembly according to claim 5, wherein
   a portion of the first support member mating structure that defines the cavity defines a first opening and the projection defines a cup holder bottom opening that aligns with the first opening to receive a fastener therein when the first end of the support member is coupled to the bottom portion of the first cup holder.

7. The vehicle console assembly according to claim 6, wherein
   the first cup holder defines a first cup holder cavity therein and the bottom portion of the first cup holder isolates the first cup holder cavity from the cup holder bottom opening.

8. The vehicle console assembly according to claim 5, wherein
   the interference structure includes at least one interference wall that contacts the projection of the first cup holder mating structure in order to inhibit upside-down installation of the support member.

9. The vehicle console assembly according to claim 2, wherein
   the first end defines a first opening therein that is configured to receive a first fastener that couples the first end to the bottom portion of the first cup holder and the second end defines a second opening therein that is configured to receive a second fastener that couples the second end to the bottom portion of the second cup holder.

10. A vehicle console assembly comprising:
    a vehicle console including first and second cup holders, each of the cup holders having an upper opening defined by a surface of the vehicle console and a bottom portion extending downwardly in the vehicle, the bottom portion of the first cup holder including a first bottom surface that extends transverse to a direction in which the bottom portion of the first cup holder extends in the vehicle, and the bottom portion of the second cup holder including a second bottom surface that extends transverse to a direction in which the bottom portion of the second cup holder extends in the vehicle, the bottom portions of the cup holders being spaced and isolated from each other such that a gap extends from the surface of the vehicle console that defines the upper openings of the cup holders to the first and second bottom surfaces; and
    a support member directly coupling the bottom portion of the first cup holder to the bottom portion of the second cup holder, the support member being spaced apart from the surface of the vehicle console that defines the upper openings, and the support member including a first end coupled to the bottom portion of the first cup holder, a second end coupled to the bottom portion of the second cup holder and an extension portion that extends between the first and second ends across a space between the bottom portions of the cup holders, the first and second ends being configured to couple to the first and second bottom surfaces, respectively.

11. The vehicle console assembly according to claim 2, wherein
    the first and second ends each have a respective width greater than a width of the extension portion.

12. The vehicle console assembly according to claim 1, wherein
the support member inhibits movement of the bottom portions of the cup holders toward each other while the support member is coupled to the bottom portions of the cup holders.

13. The vehicle console assembly according to claim 1, wherein
each of the cup holders defines a cavity therein and the bottom portion of each of the cup holders is closed and includes an outer surface that is isolated from the cavity and configured to couple to the support member.

14. The vehicle console assembly according to claim 1, wherein
the vehicle console is configured as a center vehicle console.

15. The vehicle console assembly according to claim 1, wherein
the cup holders are spaced from each other in a lengthwise direction of the vehicle.

16. The vehicle console assembly according to claim 1, further comprising
a console body having a vertical portion that extends in a vertical direction of the vehicle, the support member being spaced apart from the vertical portion when the support member couples the bottom portions of the first and second cup holders together.

17. The vehicle console assembly according to claim 6, wherein
the interference structure includes a wall that surrounds the fastener and that extends further outward from the second side of the support member than the fastener when the first end of the support member is coupled to the bottom portion of the first cup holder.

18. The vehicle console assembly according to claim 1, wherein
the bottom portion of the first cup holder includes a first bottom surface that extends transverse to a direction in which the bottom portion of the first cup holder extends in the vehicle, and the bottom portion of the second cup holder includes a second bottom surface that extends transverse to a direction in which the bottom portion of the second CUD holder extends in the vehicle; and
a gap is defined between the first and second cup holders from the first and second bottom surfaces up to the surface of the vehicle console that defines the upper openings.

19. The vehicle console assembly according to claim 4, wherein
the upper openings of the cup holders are spaced apart from each other.

20. The vehicle console assembly according to claim 10, wherein
the upper openings of the cup holders are spaced apart from each other.

* * * * *